US012598131B2

(12) United States Patent
Birmiwal et al.

(10) Patent No.: US 12,598,131 B2
(45) Date of Patent: Apr. 7, 2026

(54) ROUTING POLICIES WITH RCF EXPRESSIONS AT THE POINT OF APPLICATION

(71) Applicant: Arista Networks, Inc., Santa Clara, CA (US)

(72) Inventors: Sharad Birmiwal, Burnaby (CA); Matthieu Loriol, Vancouver (CA); Akshay Gattani, Sunnyvale, CA (US); Satish Mahadevan, San Ramon, CA (US)

(73) Assignee: ARISTA NETWORKS, INC., Santa Clara, CA (US)

( * ) Notice: Subject to any disclaimer, the term of this patent is extended or adjusted under 35 U.S.C. 154(b) by 315 days.

(21) Appl. No.: 18/451,085

(22) Filed: Aug. 16, 2023

(65) Prior Publication Data

US 2025/0062985 A1     Feb. 20, 2025

(51) Int. Cl.
*H04L 45/302*     (2022.01)
*H04L 45/02*     (2022.01)

(52) U.S. Cl.
CPC ............ *H04L 45/306* (2013.01); *H04L 45/02* (2013.01)

(58) Field of Classification Search
CPC .... H04L 41/0894; H04L 45/02; H04L 45/306
See application file for complete search history.

(56) References Cited

U.S. PATENT DOCUMENTS

| | | | | |
|---|---|---|---|---|
| 2019/0258754 | A1* | 8/2019 | Minwalla | H04L 41/145 |
| 2020/0007404 | A1* | 1/2020 | Pinheiro | G06F 9/45508 |
| 2021/0399978 | A9* | 12/2021 | Michael | H04L 43/0876 |
| 2023/0038824 | A1 | 2/2023 | Mahadevan et al. | |
| 2024/0430203 | A1* | 12/2024 | Smith | H04L 47/17 |

OTHER PUBLICATIONS

European Patent Office, Extended European Search Report for EP App No. 24194533.6 dated Jan. 22, 2025, 6 pgs.

* cited by examiner

*Primary Examiner* — Donald L Mills

(74) *Attorney, Agent, or Firm* — Fountainhead Law Group, PC

(57)     ABSTRACT

Network routes are assessed using a routing policy. The routing policy includes policy directives. A point of application in a policy directive specifies a program statement that can be immediately executed without having to make a function call. Stated differently, the program statement can be immediately executed from the point of application in the policy directive without the program statement having to be incorporated in a function.

20 Claims, 5 Drawing Sheets

ROUTING POLICIES WITH RCF EXPRESSIONS AT THE POINT OF APPLICATION

CROSS REFERENCE TO RELATED APPLICATIONS

The present disclosure relates to commonly owned U.S. Pub. No. US 2023/0038824, entitled "Efficient Runtime Evaluation Representation, External Construct Late-binding, and Updating Mechanisms For Routing Policies," filed Aug. 3, 2021, and is incorporated herein by reference in its entirety for all purposes.

BACKGROUND

Routing protocols can import (program) routes into the routing table of a network device. When advertising routes, the routing protocols may advertise only a limited set of routes from the routing table.

Routing policies can be used to control the routes that a protocol places (programs) into each table and the routes from that table that the protocol advertises. A routing policy enables the user (e.g., network administrator) to filter or otherwise control which routes a routing protocol imports into the routing table and which routes a routing protocol exports from the routing table. A routing policy also enables the user to set information associated with a route as it is being imported into or exported from the routing table. Filtering imported routes enables the user to control the routes used to determine active routes. Filtering routes being exported from the routing table enables the user to control the routes that a protocol advertises to its neighbors.

Users can create routing policies with technologies such as route-maps and RCFs (Routing Control Functions) to implement granular network controls. RCF is a tool that allows the user to programmatically define policy functions to evaluate routes.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings.

DETAILED DESCRIPTION

RCF processing can be accessed at points of application in a routing policy by specifying an RCF function call. Every route that passes through the point of application is evaluated against the specified RCF function. The specified RCF function may evaluate RCF expressions and/or in turn call one or more other RCF functions. The present disclosure expands the syntax of the routing policy to specify RCF expressions at the point of application, instead of RCF function calls. This can be useful in situations where evaluation of a given route requires a simple expression. For example, a user may simply want to disallow routes which have a certain MED value; e.g., "med is_not 100". Instead of the time-consuming and error-prone task of: writing a function to evaluate the expression "med is_not 100", defining the function in the routing policy, and downloading the routing policy; the user can simply insert an expression or edit an already existing expression at the point of application in a previously downloaded routing policy, for example via the command line interface (CLI), without having to re-download the routing policy.

In the following description, for purposes of explanation, numerous examples and specific details are set forth in order to provide a thorough understanding of embodiments of the present disclosure. Particular embodiments as expressed in the claims may include some or all of the features in these examples, alone or in combination with other features described below, and may further include modifications and equivalents of the features and concepts described herein.

Figure 1:
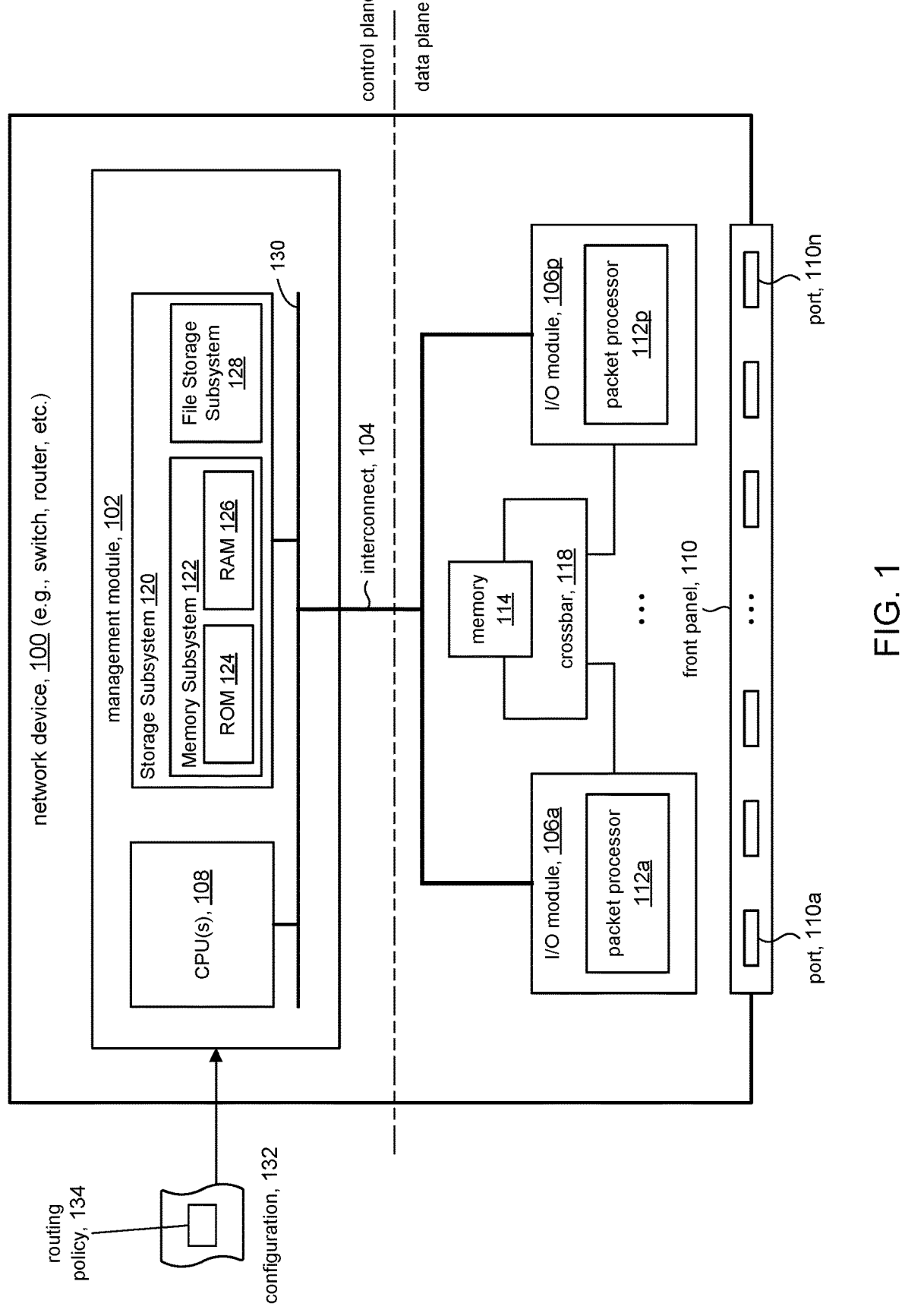
FIG. 1 is a high level example representation of a network device in accordance with the present disclosure.

FIG. 1 is a schematic representation of a network device 100 (e.g., a router, switch, firewall, and the like) that can be adapted in accordance with the present disclosure. In some embodiments, for example, network device 100 can include a management module 102, one or more I/O modules (switches, switch chips) 106a-106p, and a front panel 110 of I/O ports (physical interfaces, I/Fs) 110a-110n. Management module 102 can constitute the control plane of network device 100 (also referred to as a control layer or simply the CPU), and can include one or more management CPUs 108 for managing and controlling operation of network device 100 in accordance with the present disclosure. Each management CPU 108 can be a general-purpose processor, such as an Intel®/AMD® x86, ARM® microprocessor and the like, that operates under the control of software stored in a memory device/chips such as ROM (read-only memory) 124 or RAM (random-access memory) 126. The control plane provides services that include traffic management functions such as routing, security, load balancing, analysis, and the like.

The one or more management CPUs 108 can communicate with storage subsystem 120 via bus subsystem 130. Other subsystems, such as a network interface subsystem (not shown in FIG. 1), may be on bus subsystem 130. Storage subsystem 120 can include memory subsystem 122 and file/disk storage subsystem 128. Memory subsystem 122 and file/disk storage subsystem 128 represent examples of non-transitory computer-readable storage devices that can store program code and/or data, which when executed by one or more management CPUs 108, can cause one or more management CPUs 108 to perform operations in accordance with embodiments of the present disclosure.

Memory subsystem 122 can include a number of memories such as main RAM 126 (e.g., static RAM, dynamic RAM, etc.) for storage of instructions and data during program execution, and ROM (read-only memory) 124 on which fixed instructions and data can be stored. File storage subsystem 128 can provide persistent (i.e., non-volatile) storage for program and data files, and can include storage technologies such as solid-state drive and/or other types of storage media known in the art.

Management CPUs 108 can run a network operating system stored in storage subsystem 120. A network operating system is a specialized operating system for network device 100. For example, the network operating system can be the Arista EOS® operating system, which is a fully programmable and highly modular, Linux-based network operating system developed and sold/licensed by Arista Networks, Inc. of Santa Clara, California. It is understood that other network operating systems may be used.

Bus subsystem 130 can provide a mechanism for the various components and subsystems of management module 102 to communicate with each other as intended. Although bus subsystem 130 is shown schematically as a single bus, alternative embodiments of the bus subsystem can utilize multiple buses.

The one or more I/O modules 106a-106p can be collectively referred to as the data plane of network device 100 (also referred to as data layer, forwarding plane, etc.). Interconnect 104 represents interconnections between modules in the control plane and modules in the data plane. Interconnect 104 can be a PCIe (Peripheral Component Interconnect Express) bus or any other suitable bus architecture (e.g., SMBus (System Management Bus), I2C (Inter-Integrated Circuit), etc.).

I/O modules 106a-106p can include respective packet processing hardware comprising packet processors 112a-112p to provide packet processing and forwarding capability. Each I/O module 106a-106p can be further configured to communicate over one or more ports 110a-110n on the front panel 110 to receive and forward network traffic. Packet processors 112a-112p can comprise hardware (circuitry), including for example, data processing hardware such as an ASIC (application specific integrated circuit), FPGA (field programmable array), processing unit, and the like, which can be configured to operate in accordance with the present disclosure. Packet processors 112a-112p can include forwarding lookup hardware such as, for example, but not limited to content addressable memory such as TCAMs (ternary CAMs) and auxiliary memory such as SRAMs (static RAM).

Memory hardware 114 can include the buffers used for queueing packets. I/O modules 106a-106p can access memory hardware 114 via crossbar 118. It is noted that in other embodiments, the memory hardware 114 can be incorporated into each I/O module. The forwarding hardware in conjunction with the lookup hardware can provide wire speed decisions on how to process ingress packets and outgoing packets for egress. In accordance with some embodiments, some aspects of the present disclosure can be performed wholly within the data plane.

Configuration file 132 can be provided to network device 100 to configure various aspects of the network device; e.g., which users can log into the device, DNS (directory name server) configuration, protocol configuration, hardware configuration, and so on. In some embodiments, configuration file 132 can include routing policy 134 which represents an organization's policy for how network routes (network paths) are to be treated in the organization within which the network device is deployed; e.g., determine egress interface, VLAN tag manipulation, VxLAN encapsulation, etc.

Figure 2:
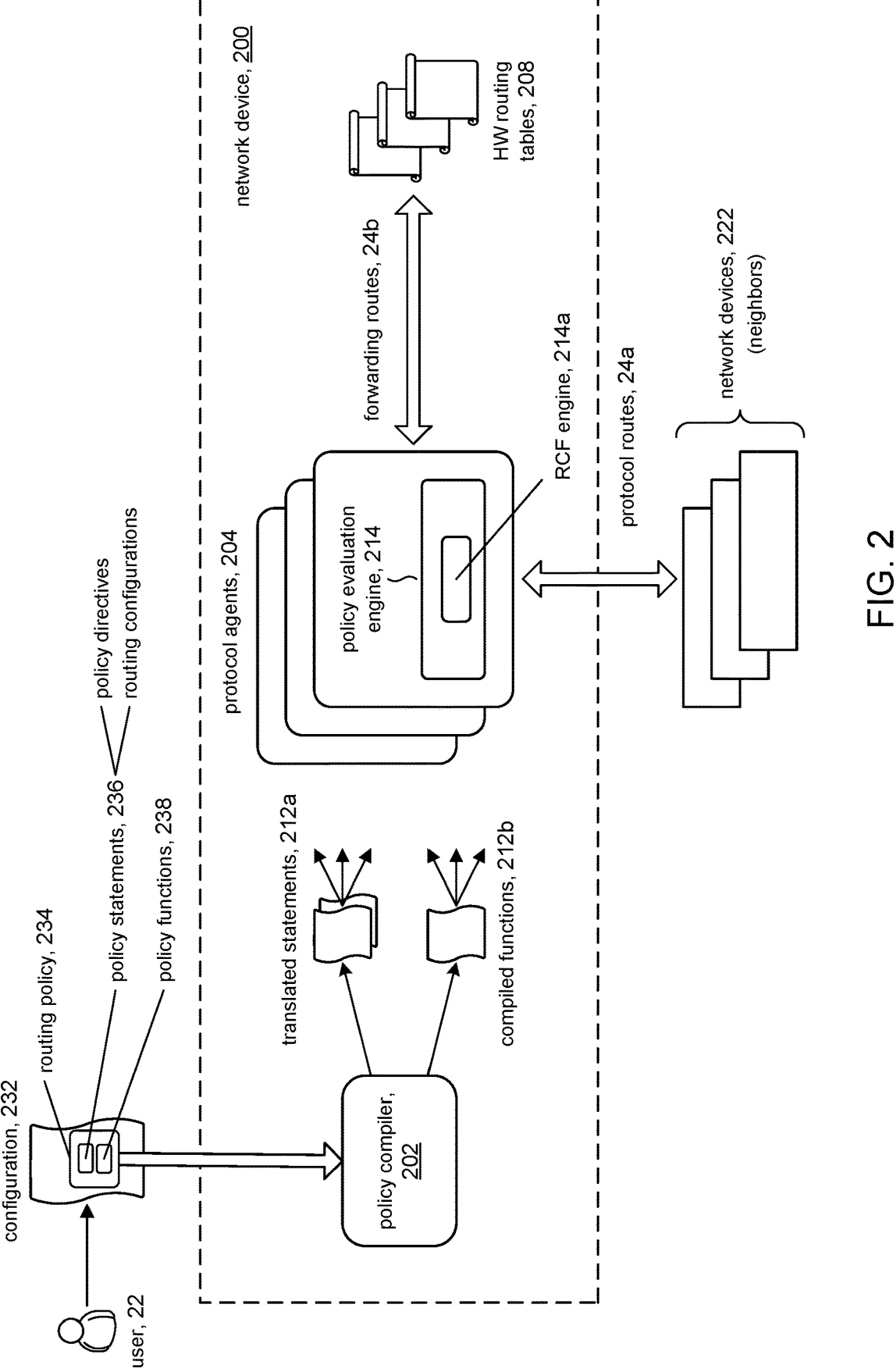
FIG. 2 illustrates policy processing elements in a network device in accordance with some embodiments.

FIG. 2 is a generalized schematic representation of a workflow in a network device for processing routes in accordance with the present disclosure. In some embodiments, for example, network device 200 can include policy compiler 202 to process a routing policy 234.

Routing policies are used to assess or otherwise evaluate routing information (routes, paths) that is exchanged among network devices in a network. Examples in the present disclosure refer to BGP (Border Gateway Protocol) which is a gateway protocol used to exchange routes. It will be appreciated, however, that the present disclosure can be adapted for use with other routing protocols, for example, OSPF (Open Shortest Path First).

Routing policies can be used to control the routes that a protocol places into a routing table of the network device, and routes from the routing table that the protocol advertises. A routing policy assesses routes to filter or otherwise control which routes can be imported into the routing table and which routes can be exported from the routing table. A routing policy also enables the user to set the information associated with a route as it is being imported into or exported from the routing table.

A routing policy specifies the conditions for matching a route and corresponding action(s) to perform on the route when a match occurs. For example, when the routing policy matches a route to be imported, the actions can modify the route's preference, mark the route with a color to identify it and allow it to be manipulated later, or prevent the route from even being installed in a routing table. When a routing table exports routes into a routing protocol, a policy might assign metric values, modify the BGP community information, tag the route with additional information, or prevent the route from being exported altogether.

In accordance with some embodiments, routing policy 234 can include functions defined using the RCF programming language. Routing policy 234 can be contained in configuration file 232 which, for example, can be provided by a user 22, a centralized network controller, etc. Policy compiler 202 can include one or more components to compile or otherwise translate the user-readable text that constitutes routing policy 234 to a suitable internal representation that the network device can execute. A policy compiler in accordance with some embodiments is disclosed in commonly owned U.S. Pub. No. US 2023/0038824, entitled "Efficient Runtime Evaluation Representation, External Construct Late-binding, and Updating Mechanisms For Routing Policies," which is incorporated herein by reference for all purposes. Routing policy 234 can include routing policy statements 236 (e.g., policy directives, routing configurations, etc.) and routing control functions (referred to herein as policy functions) 238. In some embodiments, policy compiler 202 can include a translator to produce a suitable internal representation of the human-readable policy statements 236, generically represented in FIG. 2 as translated statements 212a, which can be executed by the network device.

In accordance with some embodiments, policy functions 238 can be written in the RCF programming language. Users (e.g., network or system administrators) can write policy functions that express and evaluate policies such as route filtering and attribute modification in a programmatic fashion to facilitate processing of routes. Policy compiler 202 can include a compiler to produce a suitable internal representation of policy functions 238, represented in FIG. 2 as compiled functions 212b (e.g., evaluation trees).

Network device 200 can include protocol agents 204 (e.g., spanning tree protocol, address resolution protocol, boundary gateway protocol, etc.) that communicate with other network devices 222 (neighbors, peers, etc.) to exchange (import and export) protocol routes 24a. Protocol agents 204 can execute the translated statements 212*a* and compiled functions 212*b* to assess or otherwise evaluate protocol routes 24*a* received from BGP neighbors 222 to be programmed (imported) in the hardware routing tables 208 of the network device. Conversely, the protocol agents 204 can assess forwarding routes stored in the hardware routing tables 208 to be advertised (exported) to BGP neighbors 222. Hardware routing tables 208 can comprise any suitable persistent memory, such as TCAMs, SRAMs, etc.

Each policy agent 204 can include a policy evaluation engine 214. During processing of a received route 24*a*, 24*b*, the translated statements 212*a* and compiled functions 212*b* that constitute the routing policy are executed by the policy evaluation engine 214 to determine whether to program (import) the received route or advertise (export) the received route. Policy evaluation engine 214 can create or otherwise represent an execution environment within which to execute the translated statements and compiled functions.

In accordance with some embodiments, the policy evaluation engine 214 can include or otherwise instantiate an RCF engine 214*a* that creates or otherwise represents an RCF execution environment for executing compiled functions 212*b*. The nature of the RCF execution environment depends on the nature of the particular implementation of RCF. In some embodiments, for example, RCF can be an interpreted language, not unlike the BASIC programming language, and RCF engine 214*a* can be an interpreter that interprets human-readable policy functions directly without compiling the functions. In other embodiments, RCF can be a partially compiled language. For example, policy functions can be compiled into an intermediate representation (e.g., bytecode) and RCF engine 214*a* can be an interpreter that interprets the intermediate representation. In some embodiments, the internal representation can be expressed as an evaluation tree, such as disclosed in commonly owned U.S. Pub. No. US 2023/0038824. In other embodiments, RCF can be compiled into binary code and RCF engine 214*a* can be a virtual machine that executes the binary code.

Figure 3:
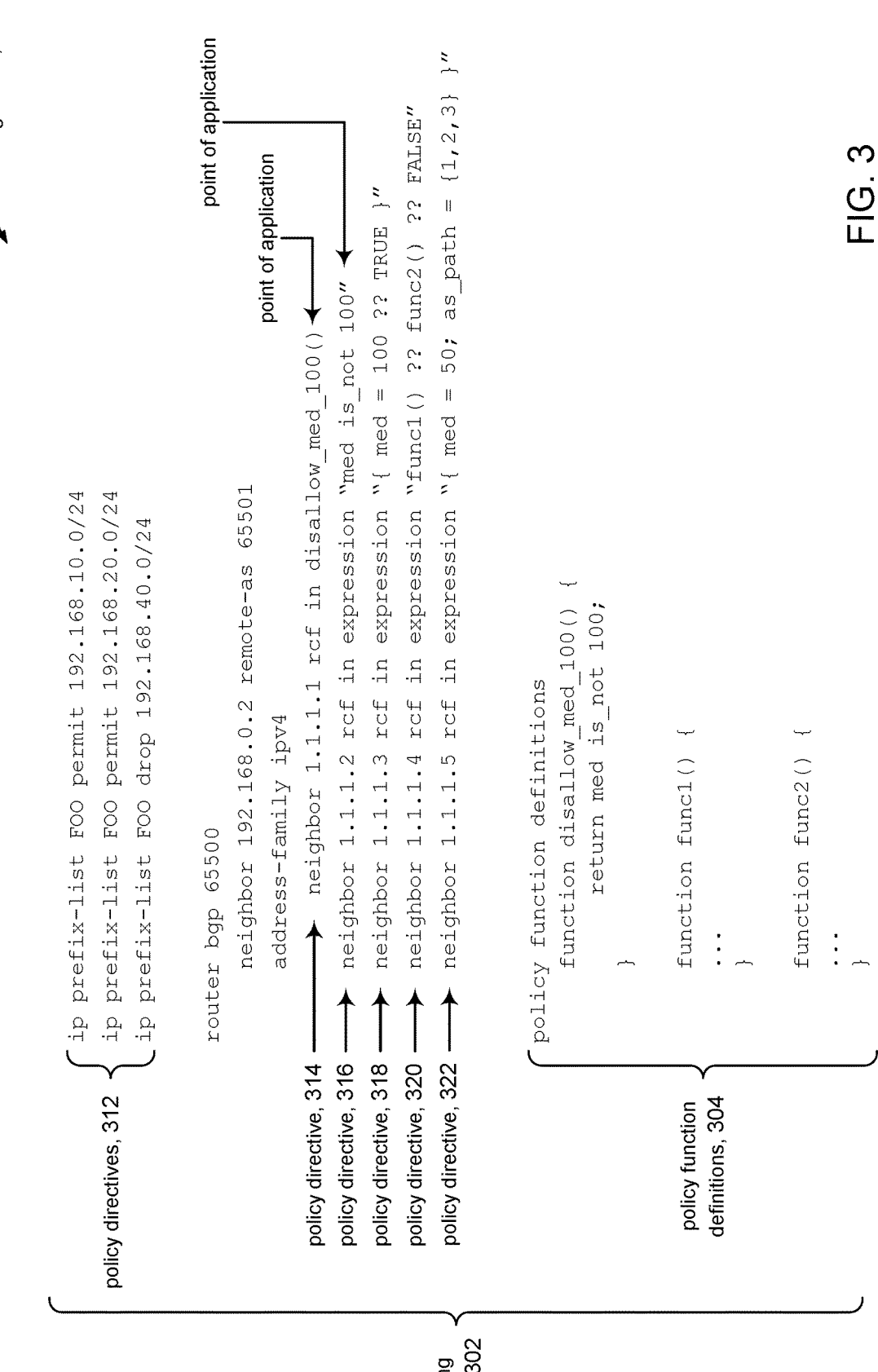
FIG. 3 is an illustrative example of a policy configuration in accordance with some embodiments.

FIG. 3 shows a portion of a configuration 300 that includes a simplified example of a BGP routing policy 302 in accordance with some embodiments. The routing policy 302 can comprise policy statements such as policy directives 312, 314, 316, 318, 320, and 322. Routing policy 302 can include a policy function definition section 304 comprising definitions of policy functions, which in the example in FIG. 3 includes function definitions for DISALLOW_MED_100 ( ) FUNC1 ( ) and FUNC2 ( ).

As can be seen in FIG. 3, the policy directive 314 invokes a policy function called DISALLOW_MED_100 ( ) at a "point of application." A policy directive (e.g., 314) that invokes a policy function can be referred to as the "point of application" of the policy function. When policy function DISALLOW_MED_100 ( ) is encountered at a point of application during execution (evaluation) of routing policy 302, the policy function is invoked and processing continues within the policy function; in other words execution transfers to the policy function. When execution of DISAL-LOW_MED_100 ( ) completes, processing can resume at the point in the routing policy that follows policy directive 314, which in the example in FIG. 3 is policy directive 316. Stated differently, execution transfers back to the routing policy and continues from the point in the routing policy that follows the point of application.

In accordance with the present disclosure, the point of application can specify RCF expressions instead of invoking an RCF function. In some embodiments, RCF expressions can be indicated by a reserved word, for example "expression", to distinguish over an RCF function. For example, the policy directive 314 invokes the RCF function called DIS-ALLOW_MED_100 ( ) at the point of application. On the other hand, the point of application in policy directive 316 specifies the reserved word "EXPRESSION" to indicate that the point of application references an RCF expression comprising one or more in-line program statements instead of a function call to an RCF function. RCF expressions comprise the program statements (lines of code) used to write RCF functions. FIG. 3 show examples of RCF program statements. The program statements are "in-line" in that they are written as part of the policy directives of the routing policy.

Referring to the examples in FIG. 3, the point of application for policy directive 316 specifies the RCF expression that comprises a single line of code:

```
"med is_not 100",
``` which is a program statement that evaluates to TRUE if the MED attribute is not set to 100.

RCF expressions at the point of application in a policy directive can include assignment statements so that path attributes can be set without having to write an RCF function. The point of application in policy directive 318, for example, specifies an assignment statement to set the MED path attribute:

```
"{ med = 100 ?? TRUE }"
```

RCF expressions at the point of application can include an RCF function call. The policy directive 320, for example, specifies an expression comprising a program statement that invokes a chain of RCF functions FUNC10), FUNC20) in sequence. The function definitions for FUNC1 ( ) FUNC2 ( ) are defined in the policy function definitions section 304. The chain of function calls can be specified directly at the point of application as shown in FIG. 3. The user does not have to go through the effort of writing a wrapper function to be invoked at the point of application, which would then execute the chain of functions.

RCF expressions at the point of application can be a block of code comprising two or more RCF program statements. Policy directive 322, for instance, specifies an assignment statement for setting the MED path attribute and another assignment statement for setting the AS path attribute. In accordance with some embodiments of the present disclosure, the block of code at the point of application can comprise multiple lines of code, as illustrated by the following policy directive for example:

```
neighbor 1.1.1.6 rcf in block
    med = 50;
    as_path = {1, 2, 3};
EOF
```

As shown in this example, in some embodiments, the multiline code block can be indicated by a suitable reserved word, for example "block", to distinguish over an RCF function or an RCF expression. A corresponding reserved word can be used to indicate the end of the code block; e.g., "EOF". The reserved words "block" and "EOF" serve as delimiters to demarcate the block of code.

Embodiments in accordance with the present disclosure allow a user to implement unique logic and common shared logic on a per point of application basis; e.g. to check against a unique MED value for several BGP neighbors, such as Customer A, Customer B, Customer C, etc. Using an RCF function at the points of application involves defining a wrapper RCF function for each point of application (e.g., for each customer) which in turn invokes the common RCF function. For example, the policy directives in the routing policy could look like:

```
neighbor CUSTOMER_A rcf in policy_for_customer_A ( )
neighbor CUSTOMER_B rcf in policy_for_customer_B ( )
neighbor CUSTOMER_C rcf in policy_for_customer_C ( )
``` and would require defining the common function and N wrapper RCF functions, where N is the number of customers:

```
function policy_for_customer_A( ) {
    return med is 10 and common( );
}
function policy_for_customer_B( ) {
    return med is 20 and common( );
}
function policy_for_customer_C( ) {
    return med is 30 and common( );
}
function common( ) {
    :
    :    // code for the common function
    :
}
```

The semantics of the expression "med is 10 and common( )" is: if med==10, then invoke the RCF function "common( )."

By comparison, using RCF expressions in accordance with the present disclosure can reduce the amount of code to just one RCF function, namely the "common ( )" RCF function, and improve readability. The original code in the wrapper functions can be incorporated as RCF expressions that invoke the "common ( )" RCF function:

```
neighbor CUSTOMER_A rcf in expression
"med is 10 and common ( )"
neighbor CUSTOMER_B rcf in expression
"med is 20 and common ( )"
neighbor CUSTOMER_C rcf in expression
"med is 30 and common ( )"
```

In this example, it can be appreciated that using RCF expressions at the point of application allows the user to implement the custom logic directly at the point of application without having to clutter the policy function definitions (e.g., 304, FIG. 3) with wrapper functions that differ only by their unique hardcoded values.

Figure 4:
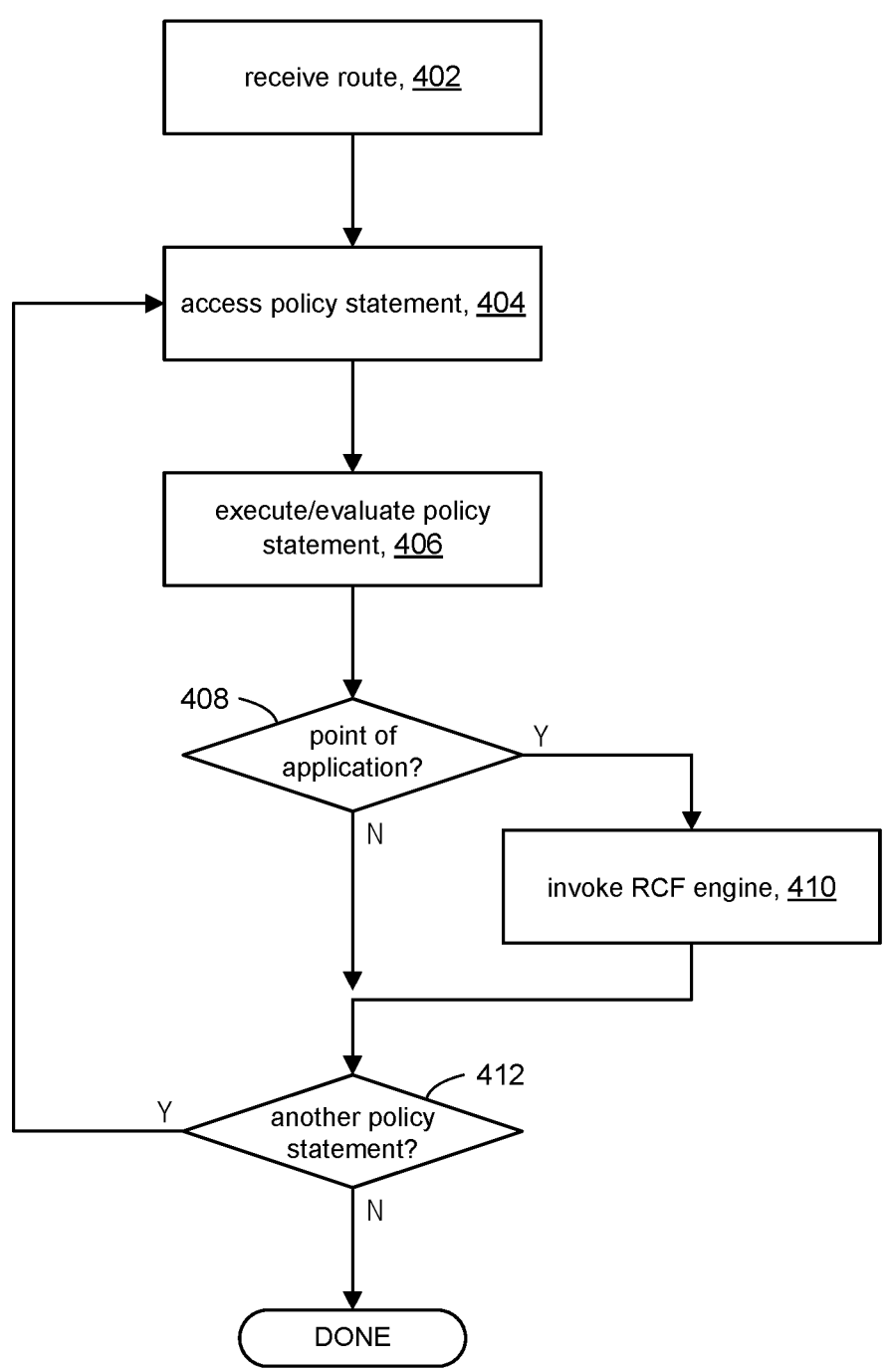
FIG. 4 shows operations in accordance with some embodiments for executing a routing policy with RCF expressions.

Referring to FIG. 4, the discussion will now turn to a high-level description of processing in a network device (e.g., 100, FIG. 1) in accordance with the present disclosure for assessing network routes using a routing policy; for example, by way of a protocol agent (e.g., 204, FIG. 2) executing a policy engine (e.g., 214). In some embodiments, for example, the network device can include one or more digital processing units, which when operated, can cause the network device to perform processing in accordance with FIG. 4. Depending on a given implementation, the processing may be performed entirely in the control plane or entirely in the data plane, or the processing may be divided between the control plane and the data plane. In some embodiments, the network device can include one or more processing units (circuits), which when operated, can cause the network device to perform processing in accordance with FIG. 4. Processing units (circuits) in the control plane, for example, can include general CPUs that operate by way of executing computer program code stored on a non-volatile computer readable storage medium (e.g., read-only memory); for example, CPU 108 in the control plane (FIG. 1) can be a general CPU. Processing units (circuits) in the data plane can include specialized processors such as digital signal processors, field programmable gate arrays, application specific integrated circuits, and the like, that operate by way of executing computer program code or by way of logic circuits being configured for specific operations. For example, each of the packet processors 112a-112p in the data plane (FIG. 1) can be a specialized processor. The operation and processing blocks described below are not necessarily executed in the order shown. Operations can be combined or broken out into smaller operations in various embodiments. Operations can be allocated for execution among one or more concurrently executing processes and/or threads.

At operation 402, the policy engine (e.g., 214) executing on the network device can receive a route to be assessed. The route can originate from a protocol agent (e.g., 204), a user (e.g., 22), etc. In the BGP context, for example, a BGP neighbor can send a route to the network device to be assessed by the routing policy to determine whether to program or drop the route. Alternatively, a route that is already programmed on the network device can be assessed by the routing policy to determine whether or not to advertise the route to its BGP neighbors.

At operation 404, the policy engine can access a policy statement from the routing policy. Policy statements can include policy directives (e.g. 312-322) as illustrated in FIG. 3 and other statements such as route configurations (e.g. "neighbor 192.168.0.2 remote-as 65501") and the like.

At operation 406, the policy engine can execute or otherwise evaluate the policy statement.

At decision point 408, if the policy statement is a policy directive that includes a point of application, then processing can proceed to operation 410 to process the point of application in the policy directive. In some embodiments, for example, a point of application can be indicated by the key words "RCF in". If the policy statement is a policy directive that does not include a point of application, then processing can proceed to decision point 412.

At operation 410, the policy engine can transfer execution to an RCF engine (e.g., 214a) to create an execution environment within which to begin executing the RCF code at the point of application. How the policy engine invokes the RCF engine will depend on what the point of application references:

If the reference at the point of application is not deemed to be a reserved word (e.g. EXPRESSION or BLOCK), then the policy engine can invoke the RCF engine by treating the reference as a function call to an RCF function. Referring for a moment to FIG. 3, for example, the point of application in policy directive 314 makes reference to "DISALLOW_MED", which is not deemed to be a reserved word. Accordingly, the policy engine can treat the reference "DISALLOW_MED" as being an RCF function, and pass "DISALLOW_MED" to the RCF engine as part of invoking the RCF engine. In some embodiments, a flag or other suitable data element can be used by the policy engine to inform the RCF engine what the policy engine is passing to the RCF engine. The policy engine can set the flag to a suitable value to inform the RCF engine that the policy engine is passing a reference to an RCF function. The RCF engine can then invoke the referenced RCF function.

If the reference at the point of application is the reserved word EXPRESSION, then the policy engine can pass a line of code following the reserved word EXPRES-SION to the RCF engine as part of invoking the RCF engine. For example, the policy engine can set the flag to a suitable value to inform the RCF engine that the policy engine is passing a line of code to an RCF function. The RCF engine can then execute the line of code without making a function call. The point of application in policy directive 316 in FIG. 3, for example, specifies an expression. Accordingly, the policy engine can pass the line of code "med is not 100" to the RCF engine, which can then execute the line of code.

If the reference at the point of application is the reserved word BLOCK, then the policy engine can pass a block of one or more lines of code between the reserved word BLOCK and the reserved word EOF as part of invoking the RCF engine. The policy engine can set the flag to a suitable value to inform the RCF engine that the policy engine is passing a block of code to an RCF function; see for example, the block of code mentioned above. The RCF engine can then execute the lines of code that constitute the block of code.

Upon completion/termination of processing in the RCF engine, processing can continue to decision point 412.

At decision point 412, if there is another policy statement in the routing policy, then processing can proceed to operation 404. Otherwise, processing of the routing policy by the policy engine to assess the network route can be deemed complete. Processing the routing policy can result in an assessment of the network route to drop the route or to permit the route, and may include setting certain information in the route. The protocol agent can decide how to handle the route based on the assessment/determination made by the routing policy. Suppose the assessment on the network route is "PERMIT". Then, if the route was received from a BGP neighbor, the protocol agent can program the route in a routing table, drop the route, or do something else with the route based on the assessment made by the policy engine. If the route was read out from a routing table, the protocol agent can advertise the route to BGP neighbors based on the assessment made by the policy engine.

Figure 5:
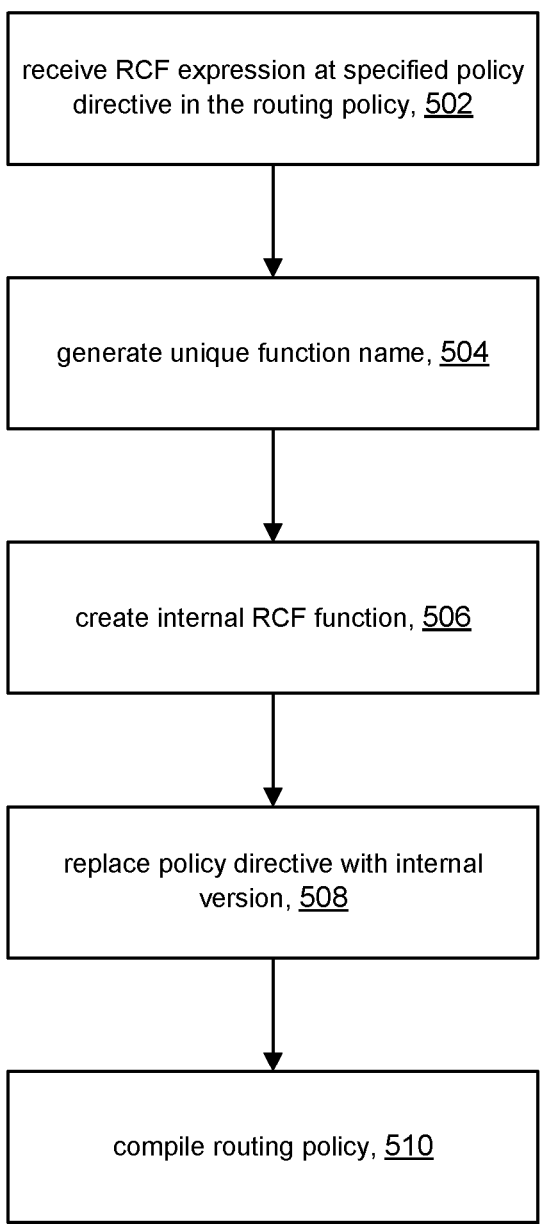
FIG. 5 shows operations in accordance with some embodiments for defining RCF expressions.

Referring to FIG. 5, the discussion will now turn to a high-level description of processing in a network device (e.g., 100, FIG. 1) in accordance with the present disclosure for defining RCF expressions. In some embodiments, for example, the network device can include one or more digital processing units, which when operated, can cause the network device to perform processing in accordance with FIG. 5. In some embodiments, the network device can present a CLI to the user.

At operation 502, the network device can receive an RCF expression from a user at a point of application in the RCF policy. The user can identify a policy directive in the routing policy to which an RCF expression is to be added, and specify one or more lines of RCF program statements that constitute the RCF expression, for example:

---
neighbor 1.1.1.2 rcf in expression "med is_not 100"

---

At operation 504, the network device can generate a unique function name for an internal RCF function. The unique function name can be generated by any suitable mechanism. It will be appreciated that, in order to avoid naming conflicts, the generated function name should be unique with respect to other internal RCF functions (e.g., using a monotonically increasing index at the end of the name) and user defined RCF functions (e.g., by prefixing the internal RCF function name with a character that is not allowed in user defined RCF function names). For discussion purposes, suppose the generated function name is:

---
_internal_func_poa_1.

---

At operation 506, the network device can create an internal RCF function having the function name generated at operation 504 and comprising the line(s) of code of the RCF expression entered by the user at operation 502. For example:

---
```
function _internal_func_poa_1( ){
    return med is_not 100; // user's line(s) of code
}
```

---

At operation 508, the network device can replace the policy directive that contains the user's RCF expression with an internal version of the policy directive that makes a function call to the internal function at the point of application. For example, the original policy directive with the user specified RCF expression:

---
neighbor 1.1.1.2 rcf in expression "med is_not 100"

--- is replaced with the internal version:

---
neighbor 1.1.1.2 rcf in function_internal_func_poa_1( ).

---

At operation 510, the network device can compile or otherwise convert the routing policy, containing the replaced policy directive that invokes the internal RCF function, to a machine readable format. When processing the routing policy hits the replaced policy directive, the internal RCF function is invoked which in turn executes the line(s) of code of the user specified RCF expression.

FURTHER EXAMPLES

Features described above as well as those claimed below may be combined in various ways without departing from the scope hereof. The following examples illustrate some possible, non-limiting combinations:

(A1) A method in a network device for assessing network routes, the method comprising: receiving a routing policy comprising a plurality of policy directives, at least one policy directive having a point of application that specifies at least one program statement, wherein the program statement at the point of application is not contained in an RCF function; receiving a network route; assessing the network route by processing the policy directives in the routing policy, wherein processing the policy directives in the routing policy includes executing the at least one policy directive, wherein executing the at least one policy directive includes: executing the program statement without first invoking an RCF function that contains the program statement; performing at least one operation specified in the program statement; and upon completing execution of the program statement, continuing processing the policy directives in the routing policy to assess the network route; and performing an action on the network route based on the assessed network route.

(A2) For the method denoted as (A1), the network route is received from a routing table in the network device or from a neighbor network device.

(A3) For the method denoted as any of (A1) through (A2), the action includes importing the network route to a routing table in the network device or exporting the network route to neighbors of the network device.

(A4) For the method denoted as any of (A1) through (A3), the at least one program statement is a single program statement that is not a function call.

(A5) For the method denoted as any of (A1) through (A4), the at least one program statement comprises two or more program statements.

(A6) For the method denoted as any of (A1) through (A5), the at least one program statement comprises a plurality of program statements delimited by a first delimiter and a second delimiter.

(A7) For the method denoted as any of (A1) through (A6), the at least one program statement comprises an expression that includes a function call statement.

(A8) For the method denoted as any of (A1) through (A7), the routing policy is downloaded to the network device in a file.

(A9) For the method denoted as any of (A1) through (A8), a user can edit the program statement via a command line interface without having to re-download the routing policy.

(B1) A network device comprising: one or more computer processors; and a computer-readable storage device comprising instructions for controlling the one or more computer processors to: receive a network route; assess the network route by processing policy directives in a routing policy, including executing at least one policy directive in the routing policy having a point of application that specifies at least one program statement, wherein executing the at least one policy directive includes: executing the program statement without having to invoke an RCF function that contains the program statement; performing at least one operation specified in the program statement; and upon completing execution of the program statement, continuing to process the policy directives in the routing policy to assess the network route; and perform an action on the network route based on the assessed network route.

(B2) For the network device denoted as (B1), the network route is received from a routing table in the network device or from a neighbor network device.

(B3) For the network device denoted as any of (B1) through (B2), the action includes importing the network route to a routing table in the network device or exporting the network route to neighbors of the network device.

(B4) For the network device denoted as any of (B1) through (B3), the at least one program statement is a single program statement that is not a function call.

(B5) For the network device denoted as any of (B1) through (B4), the at least one program statement comprises two or more program statements.

(B6) For the network device denoted as any of (B1) through (B5), the at least one program statement comprise a plurality of program statements delimited by a first delimiter and a second delimiter.

(B7) For the network device denoted as any of (B1) through (B6), the at least one program statement comprises an expression that includes a function call statement.

(C1) A method in a network device for assessing network routes, the method comprising: receiving a routing policy comprising a plurality of policy directives, at least one policy directive having a point of application that specifies at least one program statement, wherein the program statement at the point of application is not contained in an RCF function, wherein the program statement at the point of application in the at least one policy directive does not involve making a function call to an RCF function; receiving a network route; assessing the received network route by processing policy directives in the routing policy; and performing an action on the network route based on the assessed network route.

(C2) For the method denoted as (C1), the at least one program statement is a single program statement that is not a function call.

(C3) For the method denoted as any of (C1) through (C2), the at least one program statement comprises two or more program statements.

(C4) For the method denoted as any of (C1) through (C3), the at least one program statement comprises an expression that includes a function call statement.

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations and equivalents may be employed without departing from the scope of the disclosure as defined by the claims.

The invention claimed is:

1. A method in a network device for assessing network routes, the method comprising:

receiving a routing policy comprising a plurality of policy directives, wherein one or more of the policy directives are expressed using a routing control programming language (referred to herein as "RCF"), at least a first policy directive having a function call to an RCF function that comprises a plurality of RCF program statements, at least a second policy directive having an RCF program statement that is not a function call to an RCF function;

receiving a network route;

assessing the network route by processing the policy directives in the routing policy, wherein processing the policy directives in the routing policy includes executing the at least a second policy directive, wherein executing the at least a second policy directive includes:

executing the RCF program statement without first invoking an RCF function that contains the program statement;

performing at least one operation specified in the RCF program statement; and upon completing execution of the RCF program statement, continuing processing the policy directives in the routing policy to assess the network route; and performing an action on the network route based on the assessed network route.

2. The method of claim 1, wherein the network route is received from a routing table in the network device or from a neighbor network device.

3. The method of claim 1, wherein the action includes importing the network route to a routing table in the network device or exporting the network route to neighbors of the network device.

4. The method of claim 1, wherein the RCF program statement comprises two or more program statements.

5. The method of claim 1, wherein the RCF program statement comprises a plurality of program statements delimited by a first delimiter and a second delimiter.

6. The method of claim 1, wherein the RCF program statement comprises an expression that includes a function call statement.

7. The method of claim 1, wherein the routing policy is downloaded to the network device in a file.

8. The method of claim 7, wherein a user can edit the RCF program statement via a command line interface without having to re-download the routing policy.

9. A network device comprising:

one or more computer processors; and a computer-readable storage device comprising instructions for controlling the one or more computer processors to:

receive a network route;

assess the network route by processing policy directives in a routing policy, wherein the routing policy comprises one or more of the policy directives expressed using a routing control programming language (referred to herein as "RCF"), at least a first policy directive having a function call to an RCF function that comprises a plurality of RCF program statements, at least a second policy directive having an RCF program statement that is not a function call to an RCF function, wherein assessing the network route includes executing the at least a second RCF policy directive by:

executing the RCF program statement without having to invoke an RCF function that contains the RCF program statement;

performing at least one operation specified in the RCF program statement; and upon completing execution of the RCF program statement, continuing to process the policy directives in the routing policy to assess the network route; and perform an action on the network route based on the assessed network route.

10. The network device of claim 9, wherein the network route is received from a routing table in the network device or from a neighbor network device.

11. The network device of claim 9, wherein the action includes importing the network route to a routing table in the network device or exporting the network route to neighbors of the network device.

12. The network device of claim 9, wherein the RCF program statement comprises two or more program statements.

13. The network device of claim 9, wherein the RCF program statement comprises a plurality of program statements delimited by a first delimiter and a second delimiter.

14. The network device of claim 9, wherein the RCF program statement comprises an expression that includes a function call statement.

15. The network device of claim 9, wherein the routing policy is downloaded to the network device in a file.

16. A method in a network device for assessing network routes, the method comprising:

receiving a routing policy comprising a plurality of policy directives, wherein one or more of the policy directives are expressed using a routing control programming language (referred to herein as "RCF"), at least a first policy directive having a function call to an RCF function that comprises a plurality of RCF program statements, at least a second policy directive having an RCF program statement that is not a function call to an RCF function;

receiving a network route;

assessing the received network route by processing policy directives in the routing policy, including executing the at least a second policy directive; and performing an action on the network route based on the assessed network route.

17. The method of claim 16, wherein the RCF program statement is a single program statement that is not a function call.

18. The method of claim 16, wherein the RCF program statement comprises two or more program statements.

19. The method of claim 16, wherein the RCF program statement comprises an expression that includes a function call statement.

20. The method of claim 16, wherein the action includes importing the network route to a routing table in the network device or exporting the network route to neighbors of the network device.

* * * * *